Dec. 9, 1969  F. R. QUINN  3,482,777
MODULATING VALVE CONSTRUCTION
Filed Feb. 12, 1968  3 Sheets-Sheet 1
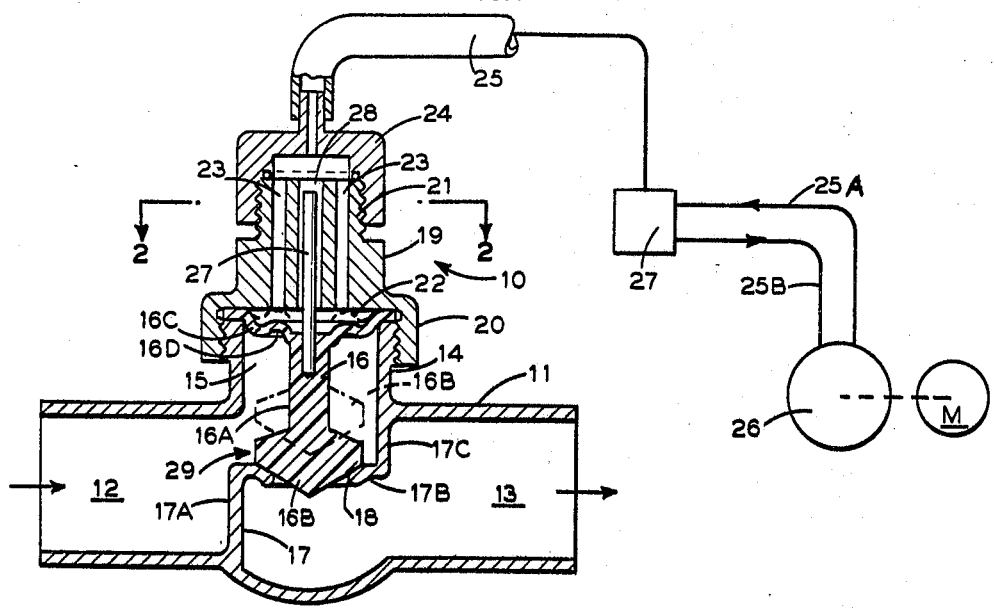
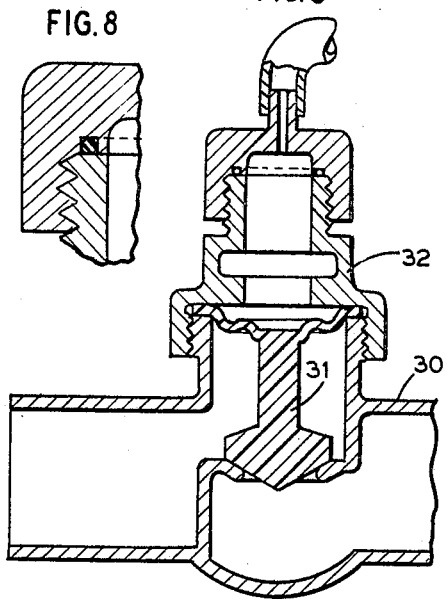
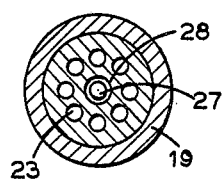
*INVENTOR.*
Frederic R. Quinn
BY
*Irving Seidman*
ATTORNEY Dec. 9, 1969     F. R. QUINN     3,482,777
MODULATING VALVE CONSTRUCTION
Filed Feb. 12, 1968     3 Sheets-Sheet 2
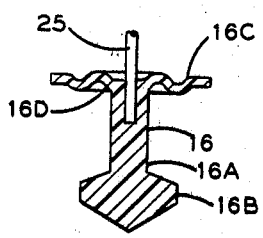
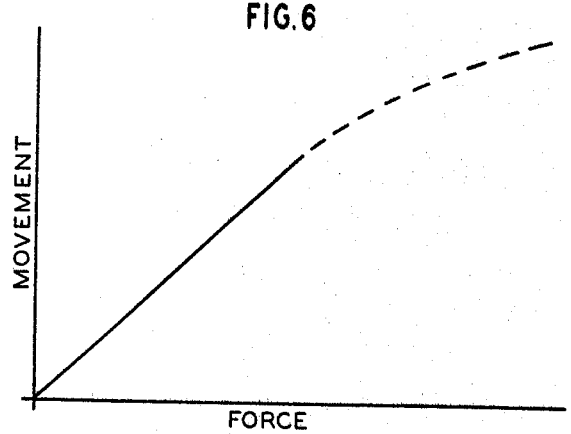
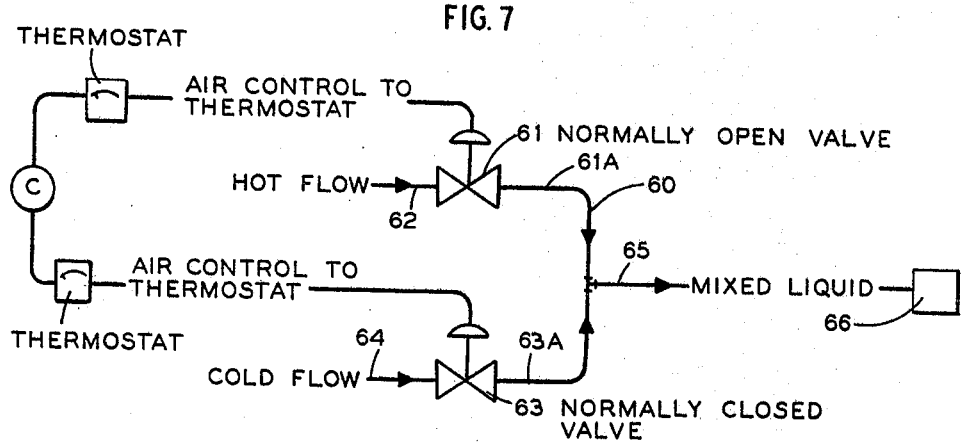
INVENTOR.
Frederic R. Quinn
BY *Irving Seidman*
ATTORNEY Dec. 9, 1969          F. R. QUINN          3,482,777
MODULATING VALVE CONSTRUCTION
Filed Feb. 12, 1968          3 Sheets-Sheet 3
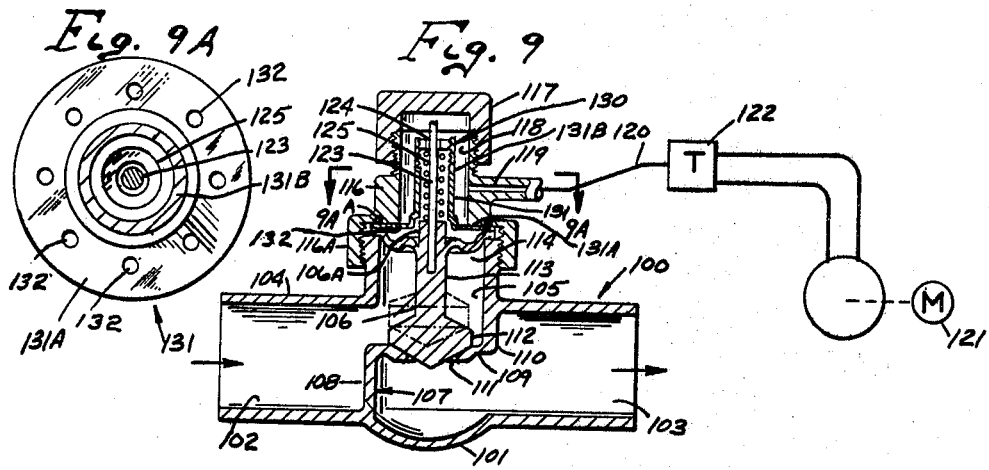
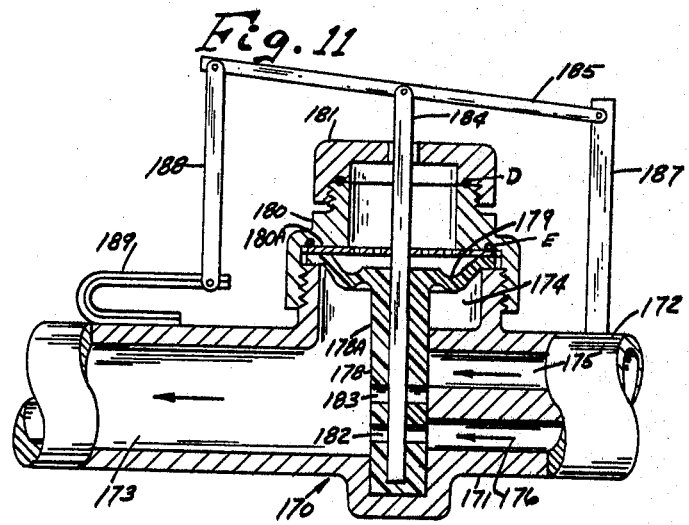
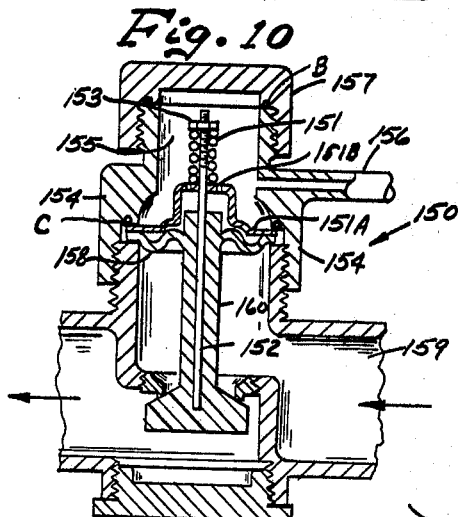
INVENTOR
FREDERIC R. QUINN
BY Irving Seidman
ATTORNEY

United States Patent Office 3,482,777
Patented Dec. 9, 1969

3,482,777
MODULATING VALVE CONSTRUCTION
Frederic R. Quinn, Red Hook, N.Y., assignor to Zyrotron Industries, Inc., South Hackensack N.J.
Continuation-in-part of application Ser. No. 615,279, Dec. 1, 1966. This application Feb. 12, 1968, Ser. No. 707,014
Int. Cl. G05d 23/185; F16k 31/365
U.S. Cl. 236—87     20 Claims

ABSTRACT OF THE DISCLOSURE

This invention is directed to either a normally open or normally closed modulating valve and a system therefor, the operation of which is rendered responsive to the pressure of an actuating fluid operating on a diaphragm which is operatively connected to a valving member. The invention also comtemplates controlling the pressure of the actuating fluid in response to temperature. In one form of the invention a biasing means is operating on the diaphragm to counteract the forces of the fluid flowing through the valve so that the pressure of the actuating fluid necessary to render the valve operative is less than that of the fluid pressures flowing through the valve. Also the invention contemplates a diaphragmed mixing valve for controlling the mixing of at least two fluids in response to temperature.

---

This is a continuation in part application of a copending application, Ser. No. 615,279 filed Dec. 1, 1966 now abandoned.

This invention relates in general to a valve construction, and more specifically to a fluid actuated, modulating valve for controlling a flow of fluid therethrough, and a fluid flow system utilizing the same. This invention is also directed to a modulating or regulating valve construction.

An object of this invention is to provide a fluid actuated valve for controlling a flow of fluid therethrough and which is constructed and arranged so that the pressure of the actuating fluid required to operate the valve is substantially less than the pressure of the fluid flowing through the valve.

Another object is to provide a fluid actuated valve which offers variable openings between the fully open position and fully closed position thereof.

Another object is to provide a valve construction having a minimum of component parts.

Still another object is to provide a valve construction in which the flow of fluid therethrough is sealed fluid tight from the fluid required to actuate the valve.

Still another object is to provide a valve construction which is free of any gravitational effects and therefore can be mounted in any given position.

Still another object is to provide a valve construction requiring a minimum amount of control power to actuate the same.

Still another object is to provide a valve construction having a long, trouble-free operating life.

Another object is to provide in a fluid-control modulating valve means for biasing the valve against the force of the fluid flowing therethrough whereby the pressure of the actuating fluid required to operate the valve is less than the pressure of the fluid flowing through the valve.

Another object is to provide a thermally controlled mixing, modulating or regulating valve construction.

The foregoing objects, and other features and advantages of this invention are attained, essentially by a valve construction comprising a valve body defining an inlet portion, an outlet portion so as to permit the flow of a fluid therethrough, and a valving chamber connected in communication therewith. The arrangement is such that the valving chamber is in open communication with the inlet portion of the valve body and means defining a valve seat connects the valving chamber in communication with the outlet portion of the valve body. Reciprocally mounted in the valving chamber is a valving means modulating the opening of the valve seat. The valving means includes a valving member having a valve head adapted to engage the valve seat in the closed position of the valve, a valve stem having one end connected thereto and a diaphragm connected to the other end of the stem. A closure means secures the diaphragm to the valve chamber to form a fluid tight seal so as to prohibit the leakage of any fluid flowing through the valve, the closure defining with the diaphragm a fluid pressure control chamber disposed on one side thereof exteriorally of the valving chamber. The closure means includes means for introducing a fluid pressure into control pressure chamber so as to exert pressure on the diaphragm. The arrangement is such that in a normally open valve the pressure of the fluid in the chamber will exert a pressure on the valve head to effect a fluid tight seal. Likewise, the pressure of the fluid in the chamber exerts a force or pressure on the diaphragm which is usually greater than the force exerted on the valve head. As a result, the downward force required to be applied to the diaphragm in order to keep the valve in its closed position needs to be only slightly greater than the sum of the forces exerted on the valving means by the flow of the fluid through the valve.

In the event that the displacement of the valving member between its open and closed positions is required to be substantial, a guide means may be provided for maintaining the valving member in alignment with the valve seat.

Operatively associated with the valve construction is a means of maintaining the valve actuating fluid under pressure within a predetermined pressure range and a thermostat responsive to temperature may be provided in circuit therewith to throttle the pressure of the actuating fluid acting on the diaphragm.

In another form of the invention a means is provided for normally biasing the valving member against the force of the fluid pressure flowing through the valve body so that the pressure of the actuating fluid needed to operate the valving member can be substantially less than the pressure of the fluid flowing through the valve.

In still another form of the invention a modulating mixing valve for mixing two or more fluids is provided with means responsive to the temperature of the fluid flowing through the valve to control the degree of mixing of the respective fluid being mixed.

A feature of this invention resides in the provision of a resilient diaphragm which is operatively connected to the valving member and which when clamped between the valve body and the closure therefor provides an effective, leak-proof seal between the valving chamber and the fluid control chamber.

Another feature of this invention is to provide an improved diaphragm construction which will permit a stable modulated fluid actuated control to be obtained so that for a constant inlet pressure, a valve opening is attained which is inversely proportional to the pressure of the control fluid with their relationship being nearly linear for a wide range.

Another feature of this invention resides in the particular diaphragm construction which renders a normally open valve to fail in its open position or a normally closed valve to fail in its closed position in the event the actuating fluid is interrupted for any reason.

A feature of this invention resides in the provision that in one form of the invention valve actuation is attained by an actuating fluid the pressure of which is substantially less than the pressure of the fluid flowing through the valve.

Another feature resides in the provision of a thermo responsive means operatively connected to the valving means to control the degree of mixing of the fluids flowing through the valve.

Another feature of the invention resides in the provision of modulation valve having a resilient means exerting a bias on the diaphragm.

Another feature of this invention resides in the provision of a modulating valve having means for adjusting the bias which the resilient means exerts on the diaphragm within a predetermined range.

Other features and advantages will become more readily apparent when considered in view of the specification and drawings in which, FIGURE 1 is a sectional side elevation view of valve construction in combination schematically with a source of actuating fluid. The solid line indicates the closed valve position, the dotted lines the normally open valve position.

FIGURE 2 is a plan section view taken along line 2—2 of FIGURE 1.

FIGURE 3 is a side elevation view of a slightly modified form of the invention shown in section.

FIGURE 4 is a side elevation view shown in section of a modified construction of the invention as applied to normally closed valve.

FIGURE 5 is a detailed section view of the valving means utilized in the embodiment of FIGURE 1.

FIGURE 6 is a graphic illustration of the force versus displacement curve of the diaphragm construction of this invention.

FIGURE 7 illustrates a fluid flow system embodying the valve construction of the instant invention for mixing a hot and a cold fluid.

FIGURE 8 is an enlarged detail.

FIGURE 9 is a sectional view of another modified valve construction. FIGURE 9A is a detail plan view of member 131 taken along line 9A—9A on FIGURE 9.

FIGURE 10 is a sectional view of still another form of the invention.

FIGURE 11 is a sectional view of still another form of the invention.

Referring to the drawings, there is shown in FIGURE 1 a valve construction 10 embodying the instant invention. It comprises essentially of a T shaped valve body 11 formed of suitable material as for example, metal or plastic. The cross head portion of the valve body defines an opposed fluid inlet portion 12 and fluid outlet portion 13, the respective ends of which are connected to a suitable conduit for carrying a fluid, e.g. a liquid or gaseous fluid, to and from therefrom. The stem portion 14 of the valve body, as shown in FIGURE 1, is disposed in open communication with the inlet fluid portion 12 and it defines a fluid valving chamber 15 on which a valving member 16 is reciprocally mounted.

A partition member 17 separates the inlet chamber 12 from the outlet chamber 13. As shown, the partition 17 comprises a lower upright portion 17A connected to a laterally offset portion 17B to which is connected an upwardly extending portion 17C. Formed in the offset portion 17B of the partition is a valve seat 18 which defines an opening or orifice for connecting the valving chamber 15 into direct communication with the outlet portion 13 of the valve body. In the illustrated embodiment the valve seat or orifice 18 is defined by a substantially frustoconical shaped wall portion converging toward the fluid outlet portion 13.

In accordance with this invention, a modulating valving means 16 is provided for controlling the opening of the valve between a fully opened and a fully closed position or any intermediate position therebetween. The valving means 16 is preferably formed of a resilient material as for example, rubber, neoprene or the like. The valving means, as shown in FIGURE 1, comprises essentially of a valve stem 16A having a conically shaped valve head 16B connected to the lower end thereof. Connected to the other end of the valve stem is a resilient diaphragm or spring disc 16C. As shown, the stem 16A, valve head 16B and diaphragm 16C may be formed as an integral unit.

As best seen in FIGURE 5, the diaphragm is provided with undulating ring shaped corrugations 16D. The undulating corrugations are defined as horizontally disposed S-shaped curves in cross-section as best viewed in FIGURE 5. The arrangement of the diaphragm 16C is such that in its normal inoperative position it will maintain the valve head connected thereto spaced from or in open position with respect to the valve seat 18 as indicated by the dotted lines of FIGURE 1. Consequently, the valve embodiment of FIGURE 1 is a normally open valve as indicated in dotted line position thereof in the inoperative position thereof.

The construction of the diaphragm 16C is such that when the rim of the diaphragm is clamped to the valve chamber by means of a closure means 19 and a force is applied thereto, the diaphragm will have a displacement versus applied force characteristic of the type indicated by the curve as shown in FIGURE 6. With a diaphragm constructed to assume the curve characteristic shown, a stable, modulated fluid actuated control can be obtained, and that for a constant inlet pressure, a valve opening is attained which is inversely proportional to the pressure of the control fluid operating on the diaphragm 16C, with their relationship being nearly linear over a wide range thereof. Thus, with the shaped undulating curvature of configuration of the diaphragm shown and as described, the diaphragm applied to a normally open valve as shown in FIGURE 1 in the dotted line position thereof will maintain the valve head of the valve means in normal open position in the inoperative position of the valve.

In the illustrated form of the invention, the diaphragm is clamped by means of the closure or cap 19 to the valving chamber 15 of the valve. Thus the chamber 15 is rendered fluid tight and prohibits the leakage of any fluid flowing from inlet to outlet through the valve. The closure or cap 19 is provided with an internally threaded flange portion 20 by which it is threadedly connected to the valving chamber. Extending upwardly therefrom the cap is provided with an externally threaded portion 21.

Referring to FIGURE 1, it is to be noted that the closure or cap 19 defines with the exterior surface of the diaphragm 16C a fluid control chamber 22 which is disposed exteriorally of the valving chamber, and a plurality of bore openings 23 extend through the cap to communicate with the interior of chamber 22.

Threaded to the threaded boss 21 of the closure 19 is a connector 24 which is adapted to receive a conduit 25 through which the control fluid, e.g. compressed air is directed to the actuating valve. As shown in FIGURE 1 the conduit 25 supplying the air pressure is operatively connected to a motor-driven air compressor 26. Disposed in the line 25 between the air compressor 26 and the valve 10 is a thermostat 27 which may be used for throttling the air pressure to the fluid control chamber. If desired, the thermostat may be rendered responsive to air or room temperature. In operation the compressed air flows from the compressor 26 to the thermostat through line 25A. Excess air is returned to a reservoir in the compressor through line 25B.

In the event that the valving member 16 is required to be displaced over a substantial extent, a guide means may be provided to maintain the valving member 16 in alignment with the valve seat. This is attained by a guide rod 27 extending up through a guide bore 28 formed in the closure or cap. Thus in the movement of the valving member 16, the guide rod 27 sliding in bore 28 positively directs the linear displacement thereof. With the valve construction described, its operation is as follows:

In the normally inoperative position of the valve, the valving member 16 is spaced above the valve seat 18 so as to render the valve normally open. This position is indicated by the dotted line position of the valve member in FIGURE 1. Thus, in response to a given thermostatic setting, controlling air pressure is directed by way of fitting 24 to the openings 23 formed in the valve closure 19 so that the compressed air may be introduced into the fluid control chamber 22 to exert a pressure on the exterior surface of the diaphragm 16C. When a sufficient air pressure is exerted on the diaphragm 16C by the controlling air pressure in chamber 22, the valving head 16B of the valve element is pressed against the valve seat 18 of the valve body to thereby shut off the flow of fluid through the valve body. The pressure of the fluid in the valving chamber 15 acting on the plug will tend to cause it to form a tight seal against the valve seat 18. Also, the fluid pressure acting in the valving chamber 15 will also tend to produce an upward thrust on the diaphragm 16C, this force being usually greater than the downward force produced by the fluid pressure acting on the valve head 16B of the valving member. As a result, the downward force required to be applied to the diaphragm 16C to keep the valve in a closed position, needs to be only slightly greater than the sum of the two forces; that is, the force needed to distort the diaphragm 16C in a downward direction need be only slightly greater than the difference between the upward and downward force produced by the fluid pressure acting on the valve means in the valving chamber.

To open the valve, the pressure of the actuating fluid, for example air, in the fluid control chamber 22 is reduced. The fluid pressure acting on the diaphragm in chamber 15 being greater than the force acting on the valve head will cause upward displacement of the diaphragm. When this occurs the valve member is lifted causing the seal of the valve seat to be broken. Once the fluid starts to flow through the valve seat 18 from the valving chamber 15 to the outlet portion 13 of the valve, the pressure in area 29 between the valve head 16B and the valve seat 18 is increased causing a reduction in the downward pressure acting on the valve head 16B. This in turn tends to assist in the upward movement of the valve head. Once the valve is opened, the upward force against the diaphragm 16C and the valve head 16B, produced by the fluid pressure in the valving chamber 15 and space 29, together with the spring action of the diaphragm, are equal in magnitude to the force extended on the diaphragm by the actuating fluid. Thus, the valve opening can be varied by varying the pressure of the actuating fluid acting on the exterior surface of the diaphragm.

The valve can then be closed simply by increasing the pressure of the control fluid to its original value.

With the construction of the valve described, the operation is such that for constant inlet pressure, the modulating valving member 16 effects an opening which is inversely proportional to the pressure of the control fluid operating in the chamber 22.

FIGURE 3 illustrates a modified form of the invention. In this form of the invention, the valve body 30 and the valving member 31 are substantially identical to that described with reference to FIGURE 1. However, in this form of the invention the closure member 32 has been modified so as to do away with the guide rod and guide bore employed in the arrangement of FIGURE 1. It has been noted that where the travel of the valving member 31 is relatively small, it becomes unnecessary to employ a guide rod since alignment is no longer a problem. For this reason, the guide rod has been eliminated from the invention as shown in FIGURE 3. In all other respects the valve 30 of FIGURE 3 is similar to that described with reference to FIGURE 1.

FIGURE 4 illustrates a further embodiment of the invention. In this form, the invention has been embodied in a normally closed valve construction 40. As shown, the valve 40 comprises a valve body 41 which defines an inlet portion 42, an outlet portion 43, and a valving chamber 44. A partition member 45 is shown separating the inlet portion 42 from the outlet portion 43. The partition 45 comprises a lower and upper upright portion 45A, 45B interconnected by a laterally offset portion 45C. In the offset portion 45C there is formed a valve seat 46 defining an opening or orifice which diverges in the direction of fluid flow therethrough. If desired, the valve body 41 may have an access opening 47 formed in the bottom of the valve body which is closed by a plug 48. In this form of the invention, a slightly modified construction of valving means 49 is required. As shown, the valving means 49 comprises a valving head 49A which is provided with conical surface 49B which is adapted to seat against the valve seat 46 on the inlet side thereof. The stem 49C connected to the head 49A extends upwardly through the valve seat. Connected to the upper end of the stem 49C is a resilient diaphragm 50. As shown, the diaphragm 50 is clamped to the upper ends of the valving chamber by means of a threaded cap closure 51. The cap or closure 51 is provided with a peripheral flange 51A having shoulder portions 52 by which the peripheral portion of the diaphragm 50 is clamped in position when the closure 51 is threaded to the valving chamber. In this form of the invention the arrangement of the valving member 49 and integrally connected diaphragm 50 is such that in the normal position of the valve, the valve head 49A is engaged in sealing relationship with the valve seat 46 thereby serving to render the valve a normally closed valve.

In this form of the invention, the valving member 49 is provided with a guide rod 53 which is arranged to be reciprocally received in a guide bore 54 formed centrally of the closure 51 and in alignment with the stem 49C of the valving member 49. Also as hereinbefore described, the closure 51 is provided with a series of bores 55 which serve as means for introducing the actuating fluid in the fluid control chamber 56 for rendering the valve operative. The coupling 57 is threaded to the closure 51 in the manner hereinbefore and connects the same to the source of actuating fluid. In this form of the invention the diaphragm 50 serves to render the valve member to fail in its normally closed position in the event the introduction of actuating fluid to chamber 56 is interrupted.

FIGURE 7 illustrates an application of the valve constructions of this invention in a flow system 60 for mixing hot and cold fluids, e.g. for maintaining bath water at substantially constant temperature. In the illustrated embodiment, a normally open valve 61, as described with reference to either FIGURE 1 or FIGURE 3 is disposed in the branch 62 supplying the hot fluid, and a normally closed valve 63 as described with reference to FIGURE 4 is disposed in a branch 64 supplying a cold fluid. The outlets 61A, 63A of the respective valves 61, 63 connect to a common branch 65 which connects to a suitable receiver 66 of the fluid mixture, as for example, a tub, shower, or radiator of the like in case of use in a heating system. Each of the valves 61, 63 is operatively connected to a thermostat which is connected in the line connecting the valves with the source of actuating fluid, e.g. an air compressor, so that the amount of actuating fluid introduced into the fluid control chambers of the respective valves can be throttled in accordance with temperature. For example, the thermostat may be set to supply actuating fluid to valve 61 so as to exert a pressure sufficient to maintain said valve 61 closed at temperatures above 70°. Thus it will be apparent that the respective valves are each independently modulated in accordance with temperature so as to attain a mixture having a substantially constant temperature. Also, it is to be noted that in the event that there is a break or interruption in the fluid pressure to the respective valves, the valves will automatically fail in their respective initial positions. That is, valve 61 will fail in its normally open position and valve 63 will fail in its normally closed position.

From the foregoing, it will be readily apparent that the resilient diaphragms of the respective valves, when clamped between the closure and valve body provides an effective leak-proof seal so as to maintain the fluid flowing through the valve body separated from the fluid actuating the valve. Also, the diaphragm is specifically constructed and arranged so as to maintain the valving member in either a normally open inoperative position or a normally closed inoperative position depending on whether the valve is normally open or a normally closed one. The valve construction is such that for constant inlet pressure, the valve opening is inversely proportional to the pressure on the control fluid acting on the diaphragm with their relationship being nearly linear over a wide range. The valve has a minimum number of parts which renders it useful over a long and trouble-free life. Due to the small amount of force required to operate the same, it can be controlled by a fluid pressure which is substantially less than the pressure of the fluid flowing through the valve body. The valve being free of gravitational effects, can be mounted in any direction without having its operation impaired by gravity.

FIGURE 9 illustrates still another modified form of the invention. In this form of the invention the valve 100 is constructed as a normally open valve including a means provided for biasing the valving member against the force or pressure of the fluid flowing through the valve body so that the pressure of the actuating fluid needed to operate the valving member can be substantially minimized. The dotted line showing illustrates the normal position of the valve. Therefore, in this form of the invention the pressure of the actuating fluid necessary to operate the valve 100 need be only slightly greater than the different between the pressure of the fluid flowing through the inlet portion of the valve and the force of the biasing means acting on the valving means in the direction opposite to the pressure of fluid flowing through the valve.

Referring more specifically to FIGURE 9, the valve 100 comprises a T-shaped valve body 101, the cross head portion of which defines a fluid inlet portion 102 and an opposed fluid outlet portion 103. The respective ends of the cross head portion are connected to a suitable conduit for conducting the fluid to and from the valve body 101. The stem portion 104 of the valve body 101 is disposed in open communication with the inlet portion 102 of the body and defines a valving chamber 105 in which a valving member 106 is reciprocally mounted. The partition 107 which separates the inlet chamber 102 from the outlet chamber 103 comprises a lower upright portion 108 connected to a laterally offset portion 109, which in turn is connected to an upwardly extending portion 110. Formed in the lateral offset portion 109 of the partition 107 is a valve seat which defines the opening 111 between the inlet portion 102 and the outlet portion 103 of the valve body. The valve seat is defined by a frusto-conically shaped wall portion that converges toward the fluid outlet portion 103 of the valve.

The modulating valving member 106 for controlling the opening of the valve seat between a fully open position and a fully closed position is illustrated as being formed of a resislient material as for example rubber, neoprene and the like. It comprises a conically shaped head portion 112 having a connected upwardly extending valve stem 113. Connected to the other end of the valve stem 113 is a resilient diaphragm 114 disc of the type hereinbefore described with respect to FIGURE 1.

The diaphragm 114 is provided with undulating ring-shaped corrugations to define horizontally disposed S-shaped curve in cross-section as noted in FIGURE 5. The diaphragm 114 is secured to the upper end of the valving chamber 105 by means of a fitting 116, which is preferably threadedly connected to the upper end of the valve body. As shown, the fitting 116 is provided with an enlarged internally threaded cup-shaped portion 116A defining an internal shoulder by which the peripheral portions of the disphragm 114 are securely clamped between the upper end of the valve body and the internal shoulders of the fitting 116. The fitting 116 is also provided at the upper end thereof with an externally threaded portion adapted to receive the closure or end cap 117. Accordingly, the fitting 116 defines a chamber 118, disposed exteriorly of the valving chamber 105, into which the actuating fluid, e.g. compressed air or the like, is introduced. Extending laterally through the wall portion of the fitting 116 is a bore 119 for conducting the actuating fluid into the fluid actuating chamber 118. Accordingly, the conduit 120 for supplying the actuating fluid or air pressure for example to the fluid actuating chamber 118 is operatively connected to a motor-driven air compressor 121. Disposed in the line between the air compressor 121 and the valve body 101 is a thermostat 122 which controls the air pressure in the fluid control chamber 118 in response to temperature. If desired, the thermostat 122 may be rendered responsive to the room or air temperature.

As shown in FIGURE 9 a means 130 is provided for adjusting the loading on the diaphragm. The adjusting means 130 comprises a member 131 having a laterally extending flange portion 131A which is disposed above the diaphragm 114 and a connected sleeve portion 131B disposed co-axially of the guide rod 123 which extends upwardly from the diaphragm 114. As best seen in FIGURE 9A the flange portion 131A of member 131 is provided with a plurality of apertures 132 to permit the free passage of the actuating fluid therethrough to operate on the diaphragm 114. The flange portion is also provided with a central aperture for receiving the guide rod 123.

Disposed about the rod 123 is a coil spring 125 for normally biasing the diaphragm 114 and connected valve means 106 against the pressure of the fluid flowing through the valve. As best seen in FIGURE 9 the valving member 106 is provided with a boss portion 106A which extends beyond the diaphragm 114 to define a seat for one end of the biasing spring 125. The other end of the spring is urged against the adjusting nut 124 which is threaded to the upper end of sleeve. By turning the nut 124 in one direction or the other, the compression of the spring may beadjusted to vary the bias which the spring normally exerts on the diaphragm 114 and valving member 106.

With the arrangement described the spring 125 normally exerts a bias on the diaphragm which is in the direction opposite to that of the fluid pressure flowing through the valve body and acting on the other side of the diaphragm. By adjusting the nut 124 to vary the compressive force of the biasing member, i.e. spring 125 the force counteracting the pressure of fluid flowing through the valve inlet and outlet on the other side of the diaphragm can be adjusted. Thus the pressure of the actuating fluid introduced into the fluid actuating chamber 118 necessary to effect the modulation of the valving member need be only slightly greater than the difference between the force exerted by the biasing spring 123 and the differential pressure acting on the diaphragm and on the valving head of the valving member. In this form of the invention it will be noted that the pressure of the actuating fluid necessary to effect the modulation of the valve need be only a fractional amount of the pressure of the fluid flowing through the valve body.

It will be noted that the adjusting means 131 can thereby function to control the pressure of the fluid flowing through the valve over a considerable range of pressures. For example, if the pressure of the fluid flowing through the valve is five pounds, then the spring 123 may be adjusted to a give setting so as to counterbalance the static head operating in the diaphragm. In the event that the pressure of the fluid flowing through the valve is fifty pounds, then the adjusting nut 124 is threaded relative to sleeve 131B to compress the spring, thereby loading the diaphragm further so that it will counteract the fifty pound pressure of the fluid flowing through the valve. Thus the valve described can be utilized in any system wherein the pressure thereof falls within the range of adjustment for a given valve. In this manner a valve of given design may be satisfactorily used in systems having different pressure requirements.

FIGURE 10 illustrates a modified form of the invention wherein the biasing means in the form of a coil spring 151 and associated disk 151A is applied to a normally closed valve of the type described with respect to FIGURE 4. The valve 150 of FIGURE 10 is substantially the same as that described with respect to FIGURE 4, with the exception that a biasing spring 151 is disposed about the guide 152 between a support disk 151A and the adjusting nut 153 threaded to the end of guide 152. As seen in FIGURES 10 and 10A, disk 151A is disposed above the diaphragm and is firmly secured between the valve body and the fitting 154. As described with respect to FIGURE 9, the support disk 151A is provided with a plurality of apertures or holes 151B to permit the actuating fluid within chamber 155 to operate on the diaphragm 158. In the arrangement illustrated it will be noted that the bias exerted by the spring 151 can be adjusted by rotation of the adjusting nut 153 to either compress or extend the spring, depending on the direction of rotation of the adjusting nut 153. Also the fitting 154 defining the control chamber 155 is provided with a side passageway or bore 156 for conducting actuating fluid into the fluid-actuating chamber; and a simple end closure 157 is threadedly connected to the upper end of the fitting 154. In this form of the invention the biasing spring 151 is disposed to exert a bias counteracting force which the fluid flowing through the valve normally exerts on the diaphragm 158 as the adjusting nut is rotated. Accordingly it will be noted that the bias exerted by the spring 151 is normally less than that exerted by the pressure of the fluid in the inlet portion 159 of the valve. Therefore, the pressure of the fluid normally acting on the diaphragm 158 will overcome the bias of the spring 151 and normally maintain the valve closed.

Modulation or opening of the valve 150 is attained by introducing an actuating fluid into the actuating chamber 155 by way of bore 156. Thus when the pressure of the actuating fluid introduced into the actuating chamber 155 exceeds the difference between the force of the spring bias acting on one side of the diaphragm 158 and force of the fluid pressure acting on the other side of the diaphragm 158, the diaphragm 158 and connected valving member 160 will be displaced accordingly to permit fluid flow through the valve body.

It will be understood that the flow of actuating fluid to the actuating chamber 155 to control the modulation of the valve 160 may be attained by a thermostatic control means of the type described with respect to FIGURES 1 and 9. In all other respects the construction of valve 150 is similar to that of valve 40 of FIGURE 4.

In FIGURE 11 there is shown a modified form of modulating valve 170 which is particularly adapted for modulating or mixing two or more fluids so as to provide an optimum mixture of the two or more fluids. For example, the valve 170 of the type disclosed in FIGURE 11 may have particular application for mixing a hot fluid or liquid with a cold fluid or liquid to provide a mixture having a predetermined optimum temperature. The valve is further provided with means whereby the mixing of the fluid is rendered responsive to the temperature of the mixed fluid.

As shown, the mixing valve construction 170 comprises a valve body 171 having an inlet portion 172 and an outlet portion 173, which has means defining a valving chamber 174 disposed between the inlet portion 172 and the outlet portion 173. In the illustrated form of the invention the valving body 171 comprises a T-shaped casting or the like in which one leg of the cross head defines the inlet portion 172 and the other leg portion of the cross head defines the outlet 173. The stem portion of the T-shaped casting defines the valving chamber 174. The inlet portion 172 is provided with at least two passageways or conduits 175, 176 through which the respective fluids to be mixed are conducted into the valve structure. A suitable conduit (not shown) for supplying the respective fluids to be mixed is suitably connected to the respective passageways 175, 176 of the inlet portion. The respective passageways 175, 176 defining the inlet portion 172 are separate and distinct from one another, and thus keep the fluid streams entering the valve distinct.

In accordance with this invention a valving means 178 is interposed in the valving chamber 174 to separate the inlet portion 172 from the outlet portion 173. The valving means 178 comprises a reciprocating gate valve 178A having a diaphragm member 179 connected to the upper portion of the gate valve. The periphery of the diaphragm 179 is seated upon the upper end of the stem of the casting and is secured thereto by a fixture 180 which is threadedly connected to the casting. This is attained by providing the fixture 180 with an internally threaded portion which is adapted to engage an externally threaded portion of the stem, with the peripheral edges of the diaphragm secured therebetween. If desired, an end cap 181 is threadedly connected to the upper end of the fixture. Between the threaded end of the stem portion and fixture 180, there may be disposed a perforated disk 180A as shown. Disk 180A, disposed above the diaphragm in normally spaced relationship as shown, will function as a stop to limit the upward movement of the valve gate 178.

In accordance with this invention the valve gate 178A is provided with an opening 182 disposed in axial alignment with one of the fluid inlet passageways 176. The arrangement is such that the opening 182 in the valve gate is disposed in open communication with passageway 176 in any adjusted position of the gate. In this manner passageway 176 is always in communication with the outlet portion through opening 182.

The gate member is further provided with a second opening 183. The second opening 183 is normally disposed so as to be out of communication with the other of the passageways, 175. Thus, in the position shown in FIGURE 11, passageway 175 is sealed off to prohibit the fluid therein from flowing to the outlet 173.

Accordingly, in the form of the invention shown in FIGURE 11 it will be noted that one of the fluid streams 176 is normally disposed in open communication to the outlet portion 173 whereas the other may be either normally sealed off or partially sealed off. In the illustrated embodiment passageway 175 is normally sealed off by the gate valve.

In operation, movement of the gate valve 178A upwardly will cause opening 183 therein to move into communication with passageway 175, thereby causing some of the fluid in passageway 175 to flow into the outlet portion 173 and mix with the fluid flowing through passageway 176. The degree or proportion of fluids being mixed is determined by the position of opening 183 with respect to the conduit 175.

As shown, a means is provided whereby the operation of the valving gate 178A is rendered responsive to the temperature of the fluid mixed, and flowing, through the outlet portion 173 of the valve construction. This is attained by an actuator 184 connected to the gate valve 178A which extends upwardly and outwardly through the end closure 181 of the valve. An operating lever 185 is pivotally connected intermediate its ends to the end of the actuator 184. One end of the operating lever is fulcrumed to a fulcrum bar 187 extending from the casting. The other end of the lever 185 is interconnected by a link 188 to the free end of a bi-metal strip 189. Preferably the bi-metal strip 189 is formed with a U-shaped configuration, one end of which is connected in heat transfer relationship to the outlet portion of the valve body. The arrangement of the bi-metal strip 189 is such that the free end thereof is free to flex in accordance with the amount of heat conducted thereinto. The connection of the valve gate 178A to the bi-metal strip is such that the flexing of the bi-metal strip will cause the gate valve 178A to respond accordingly, thereby permitting more or less of the second fluid to be mixed with the first fluid.

In the event that the valve construction is to be used as a mixing valve for bath water, the respective cold water and hot water conduits are connected to respective passageways 175 and 176, and a shut-off valve (not shown) may be interposed in the line between the respective fluid source and the mixing valve. As described, the valve construction 170 is such that one of the streams, e.g. the cold water stream, is defined as a constant flow through the valve body as the opening of the valve gate in open communication with passageway 176. The other opening 183 of the gate valve 178A and connected linkage to the bi-metal strip is calibrated to control the fluid flow of the fluid stream 175 through the valve so as to result in an optimum mixed fluid flowing out of the valve. Thus, as the bi-metal strip 189 contracts and expands in accordance with the temperature of the mixed fluid, the gate valve 178A is modulated accordingly to permit more or less of the second fluid to mix with the first fluid so that the final mixed fluid may be maintained at some predetermined optimum temperature. It will be understood that the bi-metal strip 189 may be calibrated to control the flow of either the cold stream or the hot stream, depending of course on which stream is constant flow and which stream is controlled.

While the instant invention has been disclosed with reference to a particular embodiment thereof, it is to be appreciated that the invention is not to be taken as limited to all of the details thereof as modifications and variations thereof may be made without departing from the spirit or scope of the invention.

It will also be realized that suitable O-ring seals are provided where necessary, e.g. at A in FIG. 9, B and C in FIG. 10 and D and E in FIG. 11; so as to effect proper sealing.

What is claimed is:
1. A valve construction comprising:
   a valve body comprising a T-shaped member in which the cross head of said T-shaped member defines an inlet portion and an outlet portion through which a first fluid is adapted to flow, and the stem of said T-shaped member defining a valving chamber,
   means defining an opening for communicating the inlet portion with the outlet portion, a valve seat circumscribing said opening,
   said valving chamber being disposed on the inlet side of said opening whereby said valving chamber is in constant open communication with said inlet portion,
   a modulating valving means reciprocally mounted in said valving chamber, said valving means including a valve head adapted to seat against said valve seat and a connected stem,
   a resilient diaphragm connected to the stem of said valving means and said diaphragm connected to said valving chamber to form a closure therefor whereby said first fluid flowing through the inlet portion of the valve exerts a static fluid pressure directly against said diaphragm in either position of said modulating valve means,
   a closure means comprising a fixture connected to said stem for securing said diaphragm to said valve chamber to effectively seal said valving chamber fluid-tight and whereby said fixture and diaphragm means defines a control chamber sealed against communication from valving chamber at all times,
   and means for introducing a secondary actuating fluid on the diaphragm through said closure to exert a fluid pressure thereon whereby the differential pressure between said actuating fluid and first fluid acting on the diaphragm effects modulation of said valving means between open and closed positions.

2. The invention as defined in claim 1 wherein
   said valving means includes a valve stem connected to said diaphragm and a valve head connected to said stem,
   said valve head being normally disposed on the inlet side of said opening.

3. The invention as defined in claim 2 wherein said diaphragm includes means to maintain said valving member normally opened.

4. The invention as defined in claim 2 and including means for guiding the valving member during the displacement thereof.

5. The invention as defined in claim 2 wherein said diaphragm is integrally connected to said valving member whereby the flow of fluid flowing through said body is free to exert an uninhibited pressure simultaneously on both said diaphragm and valving member under all operating conditions in which the force exerted on said diaphragm is greater than the force exerted on the valving head.

6. The invention as defined in claim 2 and including a means for normally biasing said valving means against the force of the fluid pressure flowing through said valve construction.

7. The invention as defined in claim 6 wherein said biasing means includes a spring exerting a force on said diaphragm which is less than the static head of the fluid pressure flowing through the valve so that the force of pressure of closing the valve of the actuating fluid for moving the valving member to its closed position need be only slightly greater than the difference between the force of the fluid flowing through the valve and the force of the spring acting thereon.

8. The invention as defined in claim 7 and including adjusting means to vary the loading of the spring acting on one side of said diaphragm to counteract the static loading of the fluid acting on the other side of the diaphragm.

9. The invention as defined in claim 8 wherein
   said adjusting means comprises a support disk fixedly secured in said control chamber above said diaphragm, said disk having an aperture therein, a spring guide extending upwardly from said diaphragm, and through said support disk,
   said guide having a threaded upper end portion, and a nut threaded to the upper end of said guide, and said spring being disposed between said support disk and said adjusting nut whereby the bias of said spring is adjusted by rotation of said nut.

10. The invention as defined in claim 2 wherein
    said opening defines a valve seat converging in the direction of fluid flow through the valve,
    and said valve being of conical shape converging in the direction of flow.

11. The invention as defined in claim 8 and including means for controlling the amount of actuating fluid pressure operating on said diaphragm to control the modulation of said valving member accordingly.

12. The invention as defined in claim 11 wherein said control means includes a means responsive to temperature for controlling the pressure of the actuating fluid operating on said diaphragm.

13. The invention as defined in claim 1 wherein said valving means comprises a valve stem extending through said opening and having one end connected to said diaphragm and having a valve head connected to the other end thereof, whereby said valve head is disposed on the upstream side of said opening.

14. The invention as defined in claim 13 wherein said diaphragm includes means to maintain said valve normally closed.

15. The invention as defined in claim 13 and including means for biasing said diaphragm against the pressure of the fluid flowing through said valve.

16. The invention as defined in claim 15 wherein said biasing means includes a spring acting on said diaphragm.

17. The invention as defined in claim 16 and including means to adjust the bias of said spring.

18. A fluid flow system comprising:
a valve disposed in a fluid flow line,
said valve including a T-shaped valve body having a cross head portion defining an inlet portion, an outlet portion, and a stem portion defining a valving chamber portion,
said inlet portion being in open unrestricted communication with said valving chamber portion,
means defining a valve seat connecting said valving chamber portion in communication with said outlet portion,
a valving member having a conical valve head reciprocally mounted in said valving chamber portion for valving said valve seat,
a resilient diaphragm,
a closure means for securing said diaphragm across the valve chamber portion to effectively seal said chamber fluid tight as to prohibit the leakage therefrom of the fluid flowing therethrough, said closure means and diaphragm defining therebetween a control chamber sealed from communication with said valving chamber at all times,
said valving member including a valve stem and a valve head, said valve stem being operatively connected to said diaphragm, whereby the fluid flowing through the valve body exerts a fluid pressure on both said diaphragm and said valve head under all operating conditions, and said diaphragm being normally flexed to maintain said valving member in open valve position,
means for introducing the pressure of another fluid through said closure for acting on the other side of the diaphragm,
and means responsive to temperature for controlling the amount of said other fluid pressure acting on said diaphragm whereby the pressure difference between the pressure of the fluid flowing through the valve and the pressure of the actuating fluid effects a modulation of said valving member to control the flow of fluid therethrough accordingly.

19. The invention as defined in claim 6 wherein said biasing means includes,
a support member fixedly secured within said control chamber,
adjusting means movably mounted on said member, and a spring means interposed between said diaphragm and said adjusting means for controlling the bias of said spring means on said diaphragm.

20. A valve construction comprising:
a valve body having an inlet portion and an outlet portion through which a first fluid is adapted to flow,
means defining an opening for communicating the inlet portion with the outlet portion,
a valve seat circumscribing said opening,
means defining a valving chamber on the inlet side of said opening whereby said valving chamber is in constant open communication with said inlet portion,
a modulating valving means reciprocally mounted in said valving chamber, said valving means including a head adapted to seat against said valve seat and a connected stem,
a resilient diaphragm connected to the stem of said valving means and said diaphragm connected to said valving chamber to form a closure therefore whereby said first fluid flowing through the inlet portion of the valve exerts a static fluid pressure directly against said diaphragm in either direction of said modulating valve means,
a closure means for securing said diaphragm to said valve chamber to effectively seal said valving chamber fluid-tight whereby said closure means and diaphragm means defines a control chamber sealed against communication from said valving chamber at all time,
and means for introducing a secondary actuating fluid on the diaphragm through said closure to exert a fluid pressure thereon whereby the differential pressure between said actuating fluid and first fluid acting on the diaphragm effects modulation of said valving means between open and closed positions,
said valve head being normally disposed on the inlet side of said opening,
and means for normally biasing said valving means against the force of the fluid pressure flowing through said valve construction,
said biasing means including a support member fixedly secured within said control chamber,
adjusting means movably mounted on said member,
and a spring means interposed between said diaphragm and said adjusting means for controlling the bias of said spring means on said diaphragm,
said support member comprising a flange portion having an opening formed therein, and a connected sleeve portion,
said flange portion being fixedly secured in said control chamber,
said sleeve having an upper threaded end portion,
and said adjusting means including an adjusting nut threadedly engaged to the upper threaded end of said sleeve,
and said spring means being disposed within said sleeve portion between said diaphragm and said adjusting nut.

References Cited

UNITED STATES PATENTS

| Number | Date | Name | Class |
|---|---|---|---|
| 954,532 | 4/1910 | Mallory | 236—80 X |
| 988,725 | 4/1911 | Mallory | 236—80 X |
| 1,091,660 | 3/1914 | Hornung | 236—92 |
| 1,489,811 | 4/1924 | Beggs | 137—492 |
| 1,763,666 | 6/1930 | Machlet. | |
| 1,925,301 | 9/1933 | Campbell | 236—80 X |
| 1,964,921 | 7/1934 | Lundberg | 251—45 X |
| 2,265,599 | 12/1941 | Griffey | 236—92 |
| 2,293,068 | 8/1942 | McLaughlin | 251—61 |
| 2,353,143 | 7/1944 | Bryant | 251—61 X |
| 2,575,042 | 11/1951 | Branson | 236—80 |
| 2,672,293 | 3/1954 | Ludlow | 236—87 X |
| 2,733,865 | 2/1956 | Ehlke | 236—92 |
| 3,113,756 | 12/1963 | Griffo | 251—57 |
| 3,120,377 | 2/1964 | Lipschultz et al. | 251—570 |

EDWARD J. MICHAEL, Primary Examiner

U.S. Cl. X. R.

236—12; 251—61.5